US011240244B2

(12) United States Patent
Murdoch et al.

(10) Patent No.: US 11,240,244 B2
(45) Date of Patent: Feb. 1, 2022

(54) PRESENTATION INTERRUPT FOR A DID ATTESTATION

(71) Applicant: MICROSOFT TECHNOLOGY LICENSING, LLC, Redmond, WA (US)

(72) Inventors: Brandon Murdoch, Reading (GB); Ankur Patel, Sammamish, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 398 days.

(21) Appl. No.: 16/453,776

(22) Filed: Jun. 26, 2019

(65) Prior Publication Data

US 2020/0412721 A1     Dec. 31, 2020

(51) Int. Cl.
*H04L 29/06*      (2006.01)
*G06F 16/23*      (2019.01)

(52) U.S. Cl.
CPC .......... *H04L 63/10* (2013.01); *G06F 16/2365* (2019.01)

(58) Field of Classification Search
None
See application file for complete search history.

(56) References Cited

U.S. PATENT DOCUMENTS

| 2019/0158275 | A1* | 5/2019 | Beck | G06F 16/2379 |
| 2019/0303541 | A1* | 10/2019 | Reddy | H04L 9/0643 |
| 2019/0303623 | A1* | 10/2019 | Reddy | G06F 11/3692 |
| 2020/0184470 | A1* | 6/2020 | Singh | H04L 9/3239 |

(Continued)

FOREIGN PATENT DOCUMENTS

| CN | 109918942 A | 6/2019 |
| WO | 2011162750 A1 | 12/2011 |
| WO | 2019075156 A1 | 4/2019 |

OTHER PUBLICATIONS

Grabatin, Michael; Hommel, Wolfgang. Reliability and scalability improvements to identity federations by managing SAML metadata with distributed ledger technology. NOMS 2018—2018 IEEE/IFIP Network Operations and Management Symposium. https://ieeexplore.ieee.org/stamp/stamp.jsp?tp=&arnumber=8406310 (Year: 2018).*

(Continued)

*Primary Examiner* — Jeremiah L Avery
(74) *Attorney, Agent, or Firm* — Workman Nydegger

(57) ABSTRACT

Embodiments disclosed herein are related to computing systems and methods for providing a presentation interrupt for a DID attestation. A DID attestation is accessed that is issued by a first entity of a decentralized network. The DID attestation defines information that has been generated by the first entity about a DID owner who is the subject of the DID attestation. The DID attestation includes interrupt metadata that directs that the first entity be contacted prior to the DID owner being able to present the DID attestation to a second entity of the decentralized network. In response to the DID owner attempting to present the DID attestation to the second entity, the first entity is contacted as directed by the interrupt metadata. Authorization information is received from the first entity. The authorization information indicates if the DID owner is able to present the DID attestation to the second entity.

20 Claims, 6 Drawing Sheets

(56) References Cited

U.S. PATENT DOCUMENTS

2020/0204557 A1* 6/2020 Singh .................. H04L 9/0637

OTHER PUBLICATIONS

Opiola, Lukasz et al. Trust-driven, Decentralized Data Access Control for Open Network of Autonomous Data Providers. 2018 16th Annual Conference on Privacy, Security and Trust (PST). https://ieeexplore.ieee.org/stamp/stamp.jsp?tp=&arnumber=8514209 (Year: 2018).*

"International Search Report and Written Opinion Issued in PCT Application No. PCT/US20/031975", dated Aug. 7, 2020, 11 Pages.

\* cited by examiner

600

610 — Access A DID Attestation Issued By A First Entity Of The Decentralized Network, The DID Attestation Defining Information That Has Been Generated By The First Entity About A DID Owner Who Is The Subject Of The DID Attestation, The DID Attestation Including Interrupt Metadata That Directs That The First Entity Be Contacted Prior To The DID Owner Being Able To Present The DID Attestation To A Second Entity Of The Decentralized Network

620 — In Response To The DID Owner Attempting To Present The DID Attestation To The Second Entity, Contact The First Entity As Directed By The Interrupt Metadata

630 — Receiving Authorization Information From The First Entity, The Authorization Information Indicating If The DID Owner Is Able To Present The DID Attestation To The Second Entity

*FIG. 6*

PRESENTATION INTERRUPT FOR A DID ATTESTATION

BACKGROUND

Most currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. When a party needs to verify another party's identity, the verifying party often needs to go through the centralized identity management system to obtain information verifying and/or authenticating the other party's identity.

Decentralized Identifiers (DIDs) are a new type of identifier, which are independent from any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of ledger, which provides a fairly secure platform. Since a DID is generally not controlled by a centralized management system but rather is owned by an owner of the DID, DIDs are sometimes referred to as identities without authority.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are related to computing systems and methods for providing a presentation interrupt for a DID attestation. A DID attestation is accessed that is issued by a first entity of a decentralized network. The DID attestation defines information that has been generated by the first entity about a DID owner who is the subject of the DID attestation. The DID attestation includes interrupt metadata that directs that the first entity be contacted prior to the DID owner being able to present the DID attestation to a second entity of the decentralized network. In response to the DID owner attempting to present the DID attestation to the second entity, the first entity is contacted as directed by the interrupt metadata. Authorization information is received from the first entity. The authorization information indicates if the DID owner is able to present the DID attestation to the second entity.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 6 illustrates a flow chart of an example method for providing a presentation interrupt for a DID attestation.

DETAILED DESCRIPTION

Figure 1:
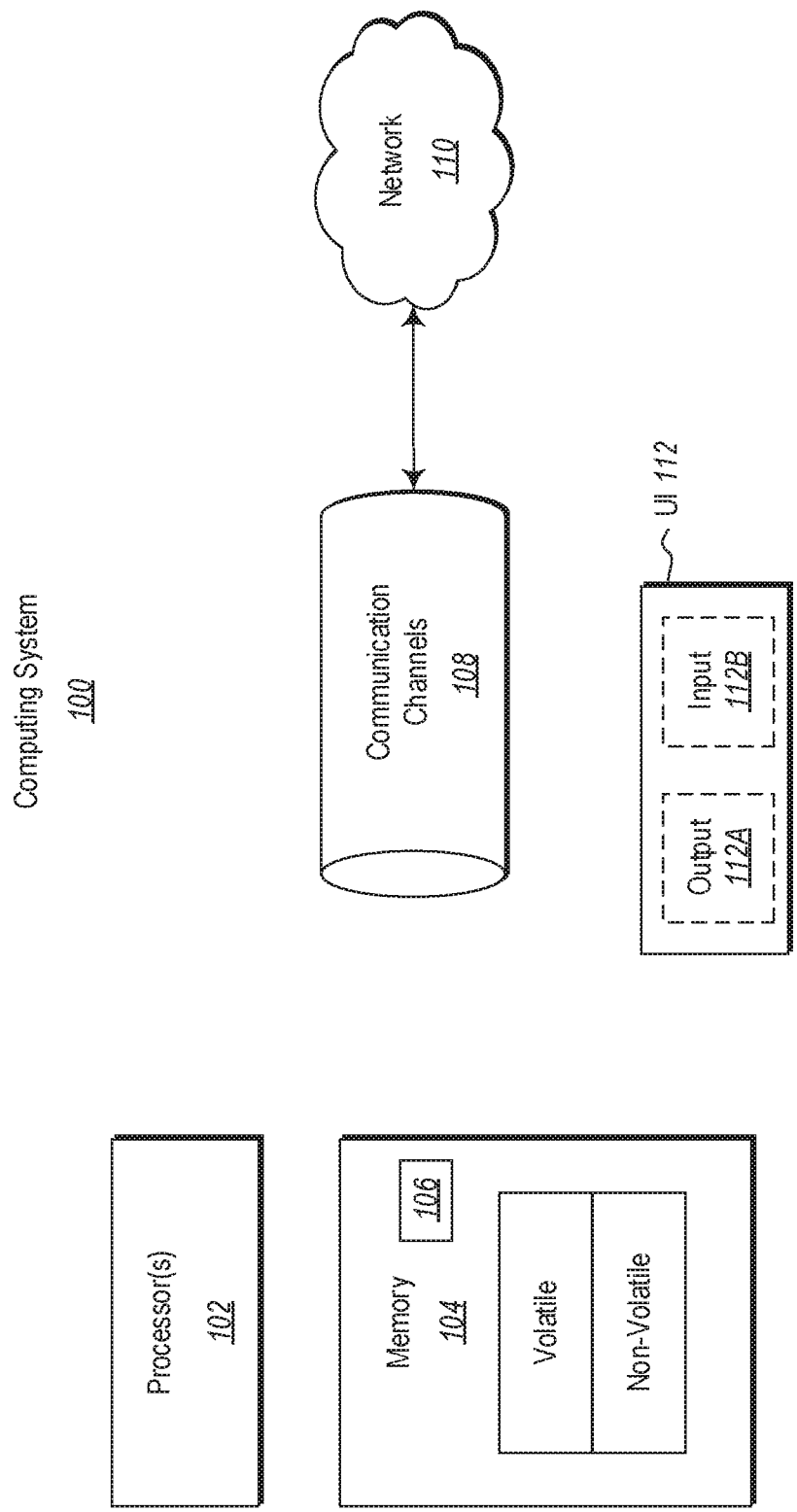
FIG. 1 illustrates an example computing system in which the principles described herein may be employed.

Embodiments disclosed herein are related to computing systems and methods for providing a presentation interrupt for a DID attestation. A DID attestation is accessed that is issued by a first entity of a decentralized network. The DID attestation defines information that has been generated by the first entity about a DID owner who is the subject of the DID attestation. The DID attestation includes interrupt metadata that directs that the first entity be contacted prior to the DID owner being able to present the DID attestation to a second entity of the decentralized network. In response to the DID owner attempting to present the DID attestation to the second entity, the first entity is contacted as directed by the interrupt metadata. Authorization information is received from the first entity. The authorization information indicates if the DID owner is able to present the DID attestation to the second entity.

The embodiments disclosed herein represent a technical advance over existing systems. For example, an entity may issue a DID attestation that includes information about the DID owner. The DID owner may subsequently want to present the DID attestation to a second entity so that the second entity may utilize the information included in the DID attestation. However, the entity that issued the DID attestation may want to have some control over which entities the DID attestation is presented to and also how and where the DID attestation is presented. For instance the entity that issued the DID attestation may want to verify that the DID owner who is attempting to present the DID attestation is actually the party who it was issued to. The entity that issued the DID attestation may also want to ensure that the DID attestation is used in a permitted geographical location or that the DID attestation is up to date.

Existing systems do not allow the entity that issued the DID attestation to have control over how the DID attestation is presented by the DID owner. The embodiments disclosed herein provide a way for the entity that issued the DID attestation to maintain at least some control over how it is presented by requiring that the DID owner contact the issuing entity for authorization before being allowed to present the DID attestation to the second entity. The issuing entity is then able to provide or deny authorization to the DID owner to present the DID attestation to the second entity as circumstances warrant. This provides enhanced security against impermissible use of the DID attestation. It also provides increased confidence by the second entity when being presented the DID attestation that the DID attestation is valid and authorized by the entity that issued the DID attestation. This reduces the amount of interaction between the parties, which results in reduced processing use and time. In addition, user convenience and productivity is increased.

Because the principles described herein may be performed in the context of a computing system, some introductory discussion of a computing system will be described with respect to FIG. 1. Then, this description will return to the principles of a decentralized identifier (DID) platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The processing unit 102 may include a general-purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, virtual or augmented reality, holograms and so forth. Examples of input mechanisms 112B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant.

Figure 2:
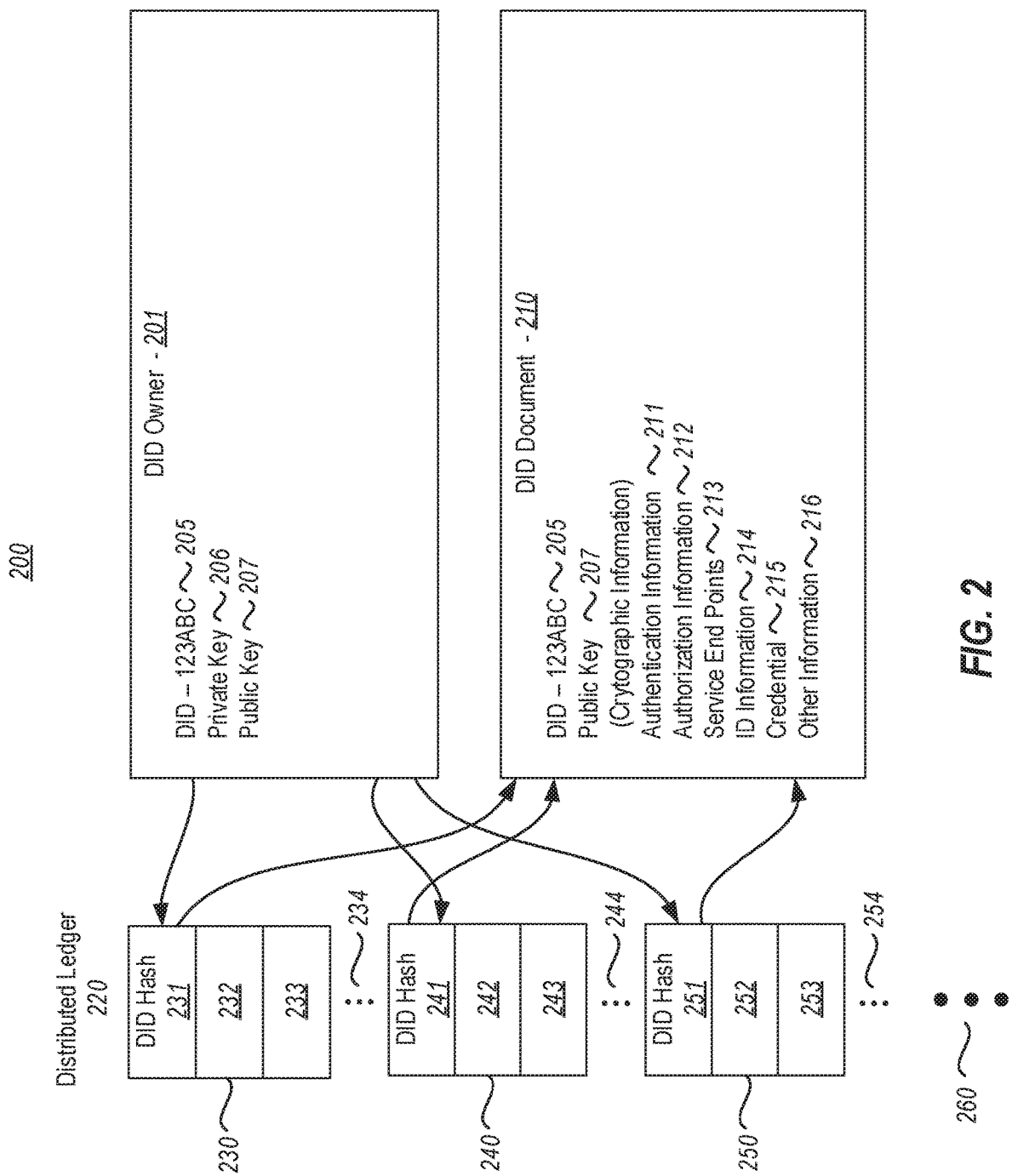
FIG. 2 illustrates an example environment for creating a decentralized identification (DID)

Some introductory discussion of a decentralized identifier (DID) and the environment in which they are created and reside will now be given with respect to FIG. 2, which illustrates portions of a decentralized network 200. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organizations. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. Accordingly, an artificial intelligence may also own a DID.

Thus, the DID owner 201 may be any entity, human or non-human, that is capable of creating the DID 205 or at least having the DID 205 created for and/or associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanisms to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs which base trust on centralized authorities and that remain under control of corporate directory services, certificate authorities, domain name registries, or other centralized authority (referred to collectively as "centralized authorities" herein). Accordingly, the DID 205 may be any identifier that is under the control of the DID owner 201 and that is independent of any centralized authority.

In some embodiments, the structure of the DID 205 may be as simple as a user name or some other human-understandable term. However, in other embodiments, for increased security, the DID 205 may preferably be a random string of numbers and letters. In one embodiment, the DID 205 may be a string of 128 numbers and letters. Accordingly, the embodiments disclosed herein are not dependent on any specific implementation of the DID 205. In a very simple example, the DID 205 is shown within the figures as "123ABC".

As also shown in FIG. 2, the DID owner 201 has control of a private key 206 and public key 207 pair that is associated with the DID 205. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanisms may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 (such as blockchain) that will be used to store a representation of the DID 205 as will be explained in more detail to follow. Thus, the DID document 210 may have different methods depending on the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used to verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of the authentication information 211 may show proof of a binding between the DID 205 (and thus its DID owner 201) and the DID document 210. In one embodiment, the authentication information 211 may specify that the public key 207 be used in a signature operation to prove the ownership of the DID 205. Alternatively, or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID owner 201 until such time as the child is no longer a minor.

The authorization information 212 may also specify one or more mechanisms that the third party will need to follow to prove they are authorized to modify the DID document 210. In some embodiments, these mechanisms may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The DID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes.

A persona may be pseudo anonymous. As an example, the DID owner 201 may include a pen name in the DID document when identifying him or her as a writer posting articles on a blog. A persona may be fully anonymous. As an example, the DID owner 201 may only want to disclose his or her job title or other background data (e.g., a school teacher, an FBI agent, an adult older than 21 years old, etc.) but not his or her name in the DID document. As yet another example, a persona may be specific to who the DID owner 201 is as an individual. As an example, the DID owner 201 may include information identifying him or her as a volunteer for a particular charity organization, an employee of a particular corporation, an award winner of a particular award, and so forth.

The DID document 210 may also include attestation information 215. The attestation information 215 may be any information that is associated with the DID owner 201's background. For instance, the attestation information 215 may be (but not limited to) a qualification, an achievement, a government ID, a government right such as a passport or a driver's license, a payment provider or bank account, a university degree or other educational history, employment status and history, or any other information about the DID owner 201's background. In some embodiments, the DID owner 201 collects various signed attestations that are included in the attestation information from different third party entities.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger 220 may operate according to any known standards or methods for distributed ledgers. Examples of conventional distributed ledgers that may correspond to the distributed ledger 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger 220.

As mentioned, a representation of the DID 205 is stored on each distributed computing system of the distributed ledger 220. For example, in FIG. 2 this is shown as DID hash 231, DID hash 241, and DID hash 251, which are ideally identical hashed copies of the same DID. The DID hash 231, DID hash 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID owner 201 creates the DID 205 and the associated DID document 210, the DID hash 231, DID hash 241, and DID hash 251 are written to the distributed ledger 220. The distributed ledger 220 thus records that the DID 205 now exists. Since the distributed ledger 220 is decentralized, the DID 205 is not under the control of any entity outside of the DID owner 201. DID hash 231, DID hash 241, and DID hash 251 may each include, in addition to the pointer to the DID document 210, a record or time stamp that specifies when the DID 205 was created. At a later date, when modifications are made to the DID document 210, each modification (and potentially also a timestamp of the modification) may also be recorded in DID hash 231, DID hash 241, and DID hash 251. DID hash 231, DID hash 241, and DID hash 251 may further include a copy of the public key 207 so that the DID 205 is cryptographically bound to the DID document 210.

Figure 3:
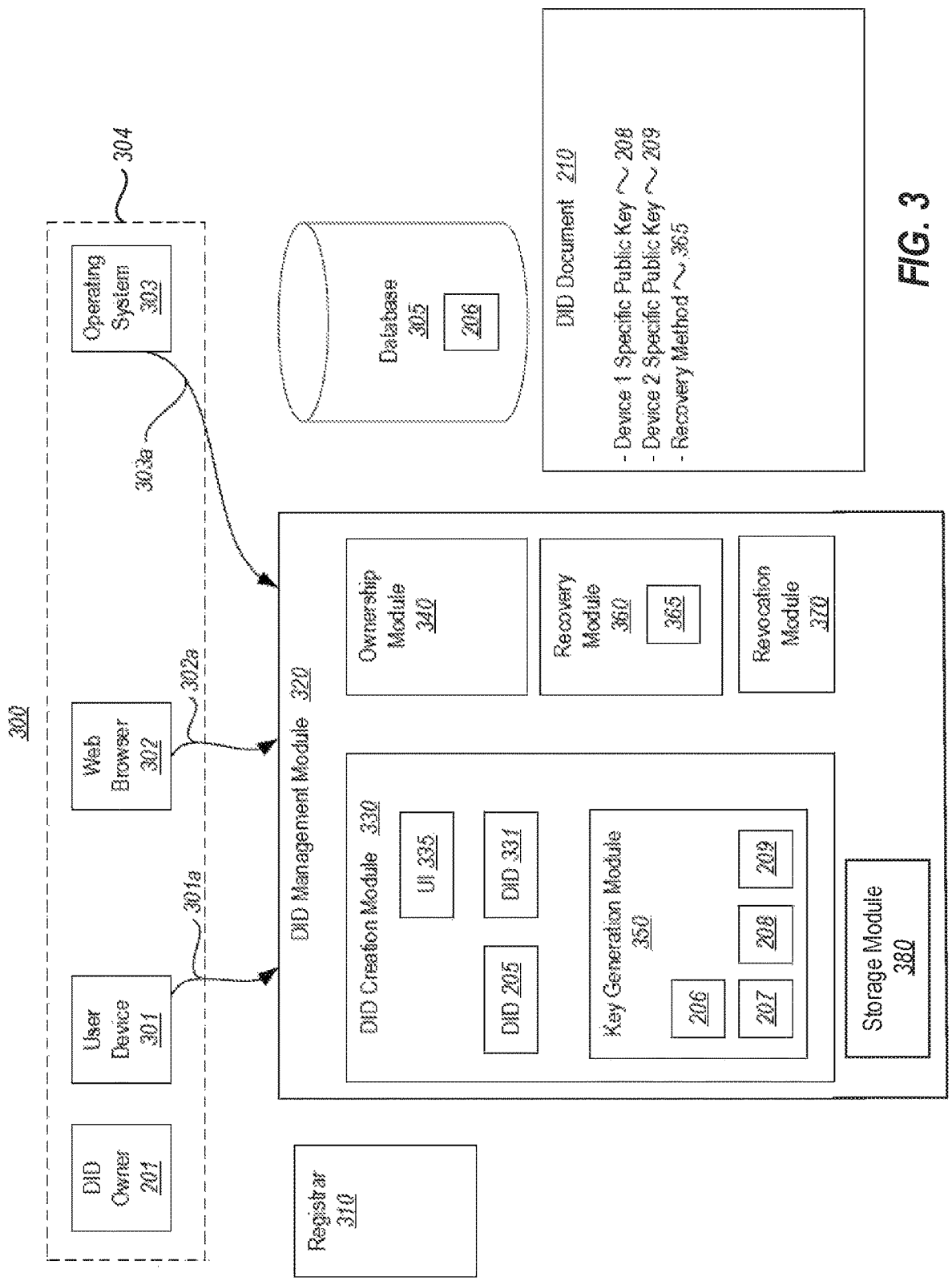
FIG. 3 illustrates an example environment for various DID management operations and services.

Having described DIDs and how they operate generally with reference to FIG. 2, specific embodiments of DID environments will now be explained. Turning to FIG. 3, an environment 300 that may be used to perform various DID management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 201. These may include a user device 301. The user device 301 may be, but is not limited to, a mobile device such as a smart phone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID management module 320. It will be noted that in operation, the DID management module 320 may reside on and be executed by one or more of user device 301, web browser 302, and the operating system 303 as illustrated by respective lines 301a, 302a, and 303a. Accordingly, the DID management module 320 is shown as being separate for ease of explanation. In some embodiments, the management module 320 may be referred to as a "digital wallet" or a "user agent".

As shown in FIG. 3, the DID management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human-recognizable name for a display name may be advantageous. The DID creation module 330 may then generate the DID 205. In the embodiments having the UI 335, the DID 205 may be shown in a listing of identities and may be associated with the human-recognizable name.

The DID creation module 330 may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record DID hash 231, DID hash 241, and DID hash 251 in the distributed ledger in the manner previously described, and to store the DID document 210 in the manner previously described. This process may use the public key 207 in the hash generation.

In some embodiments, the DID management module 320 may include an ownership module 340. The ownership module 340 may provide mechanisms that ensure that the DID owner 201 is in sole control of the DID 205. In this way, the provider of the DID management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205, which update would be reflected in a transaction on the distributed ledger 220, as previously described.

In some embodiments, however, it may be advantageous to have a public key per device 301 owned by the DID owner 201 as this may allow the DID owner 201 to sign with the device-specific public key without having to access a general public key. In other words, since the DID owner 201 will use different devices at different times (for example using a mobile phone in one instance and then using a laptop computer in another instance), it is advantageous to have a key associated with each device to provide efficiencies in signing using the keys. Accordingly, in such embodiments the key generation module 350 may generate additional public keys 208 and 209 when the additional devices execute the DID creation module 330. These additional public keys may be associated with the private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID document 210 may include the information (information 205, 207 and 211 through 216) previously described in relation to FIG. 2 in addition to the information (information 208, 209 and 365) shown in FIG. 3. If the DID document 210 existed prior to the device-specific public keys being generated, then the DID document 210 would be updated by the creation module 330 via the registrar 310 and this would be reflected in an updated transaction on the distributed ledger 220.

In some embodiments, the DID owner 201 may desire to keep secret the association of a device with a public key or the association of a device with the DID 205. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The DID creation module 330 would then generate private and public key pairs and DID documents for each of the devices and have them recorded on the distributed ledger 220 in the manner previously described. Such embodiments may be advantageous for devices that may change ownership as it may be possible to associate the device-specific DID to the new owner of the device by granting the new owner authorization rights in the DID document and revoking such rights from the old owner.

As mentioned, to ensure that the private key 206 is totally in the control of the DID owner 201, the private key 206 is created on the user device 301, browser 302, or operating system 303 that is owned or controlled by the DID owner 201 that executed the DID management module 320. In this way, there is little chance that a third party (and most consequentially, the provider of the DID management module 320) may gain control of the private key 206.

However, there is a chance that the device storing the private key 206 may be lost by the DID owner 201, which may cause the DID owner 201 to lose access to the DID 205. Accordingly, in some embodiments, the UI 335 may include the option to allow the DID owner 201 to export the private key 206 to an off device secured database 305 that is under the control of the DID owner 201. As an example, the database 305 may be one of the identity hubs 410 described below with respect to FIG. 4. A storage module 380 is configured to store data (such as the private key 206 or the attestation information 215 made by or about the DID owner 201) off device in the database 305 or in identity hubs 410 that will be described in more detail to follow. Of course, in some embodiments the storage module 380 may store at least some data on the device if the device has sufficient storage resources. In some embodiments, the private key 206 may be stored as a QR code that may be scanned by the DID owner 201.

In other embodiments, the DID management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide information that will be used by the one or more recovery mechanisms 365 during recovery. The recovery module 360 may then be run on any device associated with the DID 205.

The DID management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module 370 may access the DID document 210 and may cause that all references to the device be removed from the DID document 210. Alternatively, the public key for the device may be removed. This change in the DID document 210 may then be reflected as an updated transaction on the distributed ledger 220 as previously described.

Figure 4:
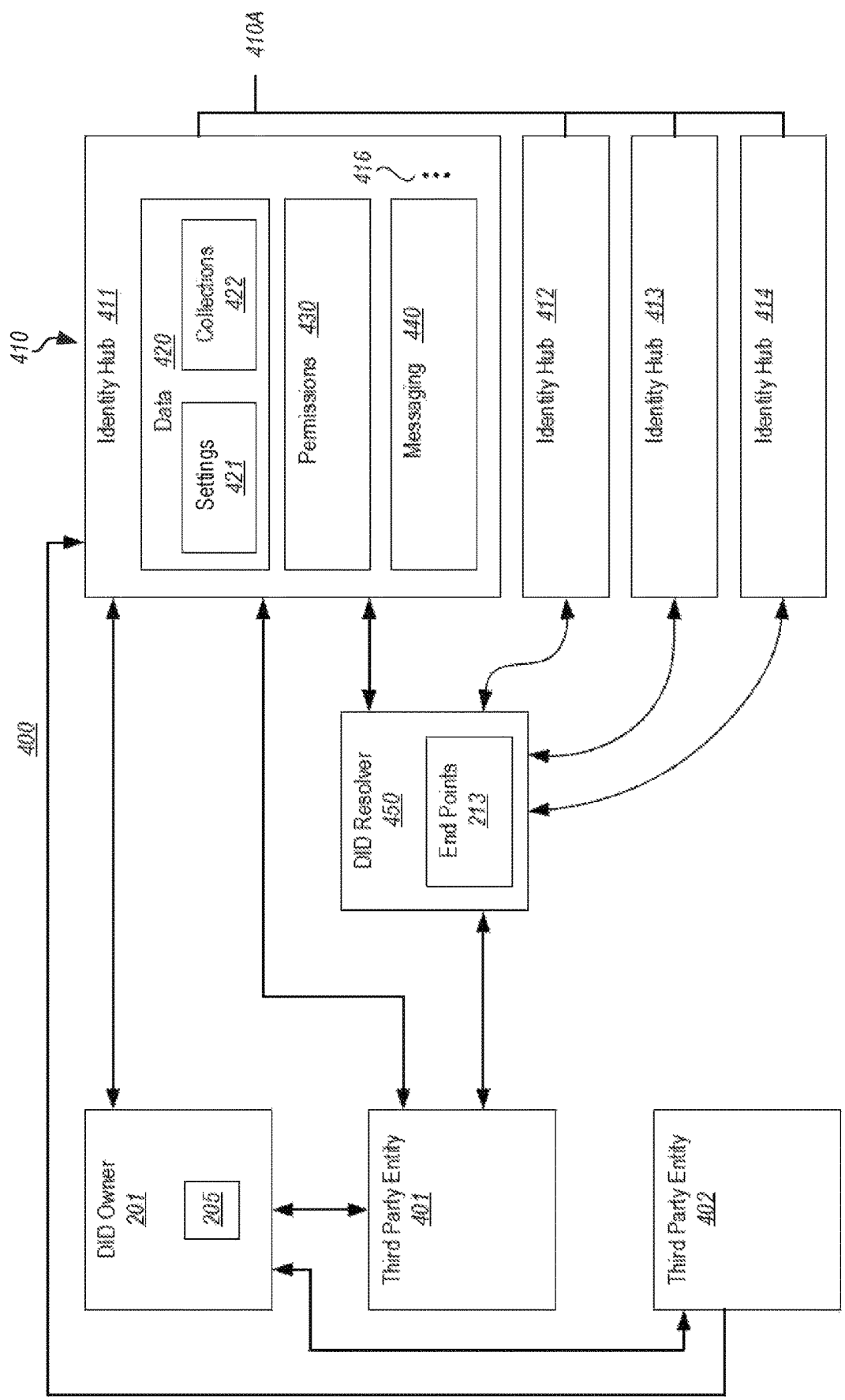
FIG. 4 illustrates an example decentralized storage device or identity hubs.

FIG. 4 illustrates an embodiment of an environment 400 in which a DID such as DID 205 may be utilized. Specifically, the environment 400 will be used to describe the use of the DID 205 in relation to one or more decentralized stores or identity hubs 410 that are each under the control of the DID owner 201 to store data belonging to or regarding the DID owner 201. For instance, data may be stored within the identity hubs using the storage module 380 of FIG. 3. It will be noted that FIG. 4 may include references to elements first discussed in relation to FIG. 2 or 3 and thus use the same reference numeral for ease of explanation.

In one embodiment, the identity hubs 410 may be multiple instances of the same identity hub. This is represented by the line 410A. Thus, the various identity hubs 410 may include at least some of the same data and services. Accordingly, if a change is made to part of at least some of the data (and potentially any part of any of the data) in one of the identity hubs 410, the change may be reflected in one or more of (and perhaps all of) the remaining identity hubs.

The identity hubs 410 may be any data store that may be in the exclusive control of the DID owner 201. As an example only, the first identity hub 411 and second identity hub 412 are implemented in cloud storage (perhaps within the same cloud, or even on different clouds managed by different cloud providers) and thus may be able to hold a large amount of data. Accordingly, a full set of the data may be stored in these identity hubs.

However, the identity hubs 413 and 414 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will be provided as this description may also apply to the identity hubs 412 through 414. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may include any other type of data, such as attestations 215 made by or about the DID owner 201.

In one embodiment, the stored data may have different authentication and privacy settings 421 associated with the stored data. For example, a first subset of the data may have a setting 421 that allows the data to be publicly exposed, but that does not include any authentication to the DID owner 201. This type of data may be for relatively unimportant data such as color schemes and the like. A second subset of the data may have a setting 421 that allows the data to be publicly exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 (or to some other associated public key) in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data. With respect to data stored by the storage module 380, these settings 411 may be at least partially composed by the storage module 380 of FIG. 3.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may give permission to any number of third parties to access a subset of the data 420. This will be explained in more detail to follow. With respect to data stored by the storage module 380, these access permissions 430 may be at least partially composed by the storage module 380 of FIG. 3.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipsis 416 represents that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs. Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge.

In this embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 410.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third-party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to services associated with the decentralized identity.

Completing the research data example, the third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may be a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 410.

Figure 5:
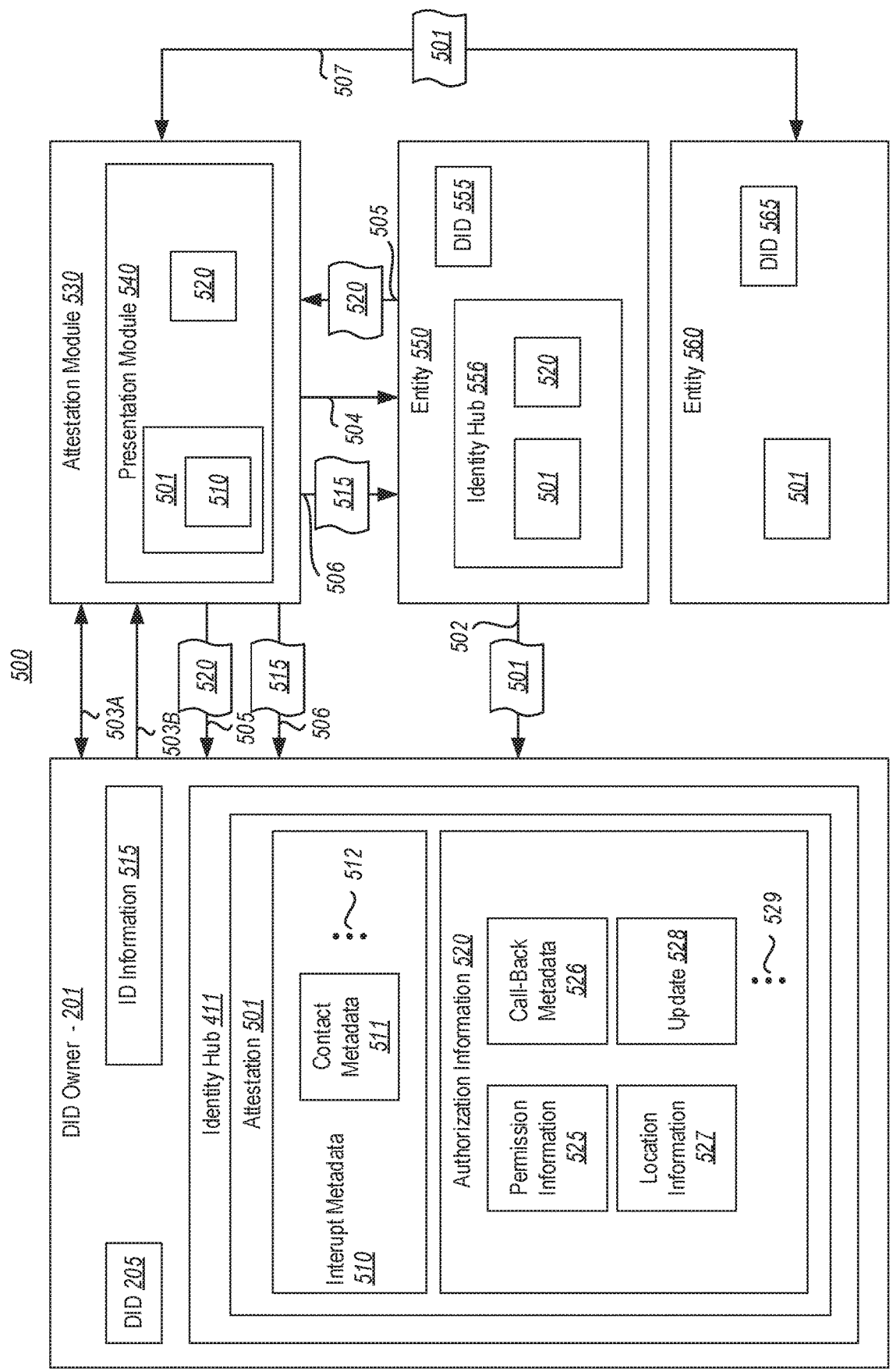
FIG. 5 illustrates an example embodiment of an environment for providing a presentation interrupt for a DID attestation.

FIG. 5 illustrates an embodiment of an environment 500 that will be used to describe a presentation interrupt for a DID attestation or claim. It will be noted that FIG. 5 may include references to elements first discussed in relation to FIGS. 2-4 and thus may use the same reference numeral for ease of explanation.

As illustrated, the environment 500 includes an attestation module 530. In one embodiment, the attestation module 530 may be implemented by a third party such as the provider of the DID management module 320 and/or the identity hubs 410. In some embodiments, the attestation module 530 may be hosted on a server computer that is separate from the devices 301 owned by the DID owner 201. In other embodiments, the attestation module 530 may be part of DID management module 320 or may at least share some functions with the DID management module 320. In still other embodiments, the attestation module 530 may be part of or controlled by a third party entity such as an entity 550 or 560.

A specific use embodiment of the attestation module 530 will now be described in relation to a presentation interrupt for a DID attestation or claim. For example, suppose that DID owner 201 was associated with an entity 550. The entity 550 may be any type of entity such as a company or an organization or even another human user. In the specific embodiment, it will be assumed that the entity 550 is a government body such as the Department of Motor Vehicles (DMV) that has issued a driver's license to the DID owner 201. As illustrated, the entity 550 may include a DID 555 that has been generated for the entity 550 in the manner previously described.

The DID owner 201 may request at any point in time a signed attestation or claim 501 from the entity 550 that verifies that the DID owner 201 has a valid driver's license that has been issued by the entity 550. In one embodiment, the request may be made directly to the entity 550 by the DID owner 201, while in other embodiments the request may be made via the DID owner 201 first contacting the attestation module 530 and then having the attestation module 530 make the request to the entity 550. The attestation 501 is thus related to the DID 205 of the DID owner 201 and may be considered a DID attestation.

The attestation 501 may also be referred to as a signed claim, credential or verified credential such as the attestation 215 of the DID document 210. That is, the attestation or verified credential may provide information about the DID owner 201 and/or about various entities the DID owner 201 has interactions with. For consistency of explanation, "attestation" will be the term used in the following discussion.

In response to the request for the attestation 501, the entity 550 may create the attestation 501 related to verifying that the DID owner 201 has a valid driver's license. In some embodiments, the attestation 501 may be a cryptographically protected pointer that points to a location of an identity hub 556 of the entity 550 where the driver's license information is held. The entity 550 may then use its public keys to digitally sign the attestation 501 to thereby verify that the entity 550 agrees that the DID owner 201 has a valid driver's license. The attestation module 530 may then request that DID owner 201 endorse or digitally sign the attestation 501 by using the public key 207. In this way, the DID owner 201 is able to verify that that he or she agrees with the driver's license information of the attestation 501 when providing the attestation 501 to other parties such as the entity 560.

In some embodiments, the attestation 501 may include various additional information besides the information that specifies that DID owner 201 has a valid driver's license. For example, the entity 550 may include interrupt metadata or information 510 in the attestation 501. As will be explained in more detail to follow, the interrupt metadata 510 may cause, whenever the DID owner 201 attempts to present the attestation 501 to an entity such as the entity 560, that the entity 550 be contacted before the attestation 501 is presented to the entity 560. Thus, the interrupt metadata 510 causes an "interruption" in the presentation process. As will also be explained in more detail to follow, the entity 550 may then be able to give or withhold authorization for the DID owner 201 to present the attestation 501 to the entity 560.

There may be various reasons why the entity 550 may desire to include the interrupt metadata 510 in the attestation 501. In one instance, the entity 550 may want to verify that the party who is attempting to present the attestation 501 is actually the DID owner 201. In another instance, the entity 550 may want to ensure that the DID owner 201 is attempting to use the attestation 501 in a permitted geographical location. In still a further instance the entity 550 may want to ensure that the attestation 501 is up to date, which may be helpful if a long period of time has passed since the entity 550 issued the attestation 501 to the DID owner 201. It will be noted that there may be any number of additional reasons why the entity 550 may want to include the interrupt metadata 510 in the attestation 501.

In some embodiments, the interrupt metadata 510 may include contact metadata 511. The contact metadata 511 may include information that directs how to contact the entity 550 when the DID owner 201 attempts to present the attestation 501 to the entity 560 or some other entity. Accordingly, in some embodiments the attestation module 530 may use the contact metadata 511 to contact the entity 550. The ellipses 512 represent that the attestation 501 may include any number of additional elements as circumstances warrant.

Although the disclosed embodiment is described in relation to providing an attestation 501 for a driver's license issued by the entity 550, this process may also be performed in other scenarios. For example, an attestation may be generated by various third party entities that are related to one or more of a qualification, an achievement, a government ID, a government right such as a passport or a driver's license, a payment provider or bank account, a university degree or other educational history. It will be noted that any number of attestations may be generated about any number of subjects and thus the embodiments disclosed herein are not limited to any specific type or number of attestations.

The attestation 501 that is generated by the entity 550 on behalf of the DID owner 201 may be provided to the DID owner as shown at 502 and stored in the identity hub 411. Accordingly, the DID owner 201 may be considered to be an attestation 501 owner since the DID owner 201 is the subject of the attestation. In other words, the attestation 501 includes information about the DID owner 201 generated by the entity 550. It will be noted that although not illustrated the entity 550 may utilize the attestation module 550 when providing the attestation 501 to the DID owner 201.

In one specific embodiment, suppose that the entity 560, which may have its own DID 565 generated in the manner previously described, is a car rental agency or like business that may rent cars or other types of motorized vehicles to the DID owner 201. Accordingly, in such embodiments the DID owner 201 may desire to present the attestation 501 to the entity 560 to prove that he or she has a valid driver's license so that the entity 560 will rent the car or motorized vehicle to him or her.

Accordingly, the attestation module 530 may include an attestation presentation module 540. In operation, the attestation presentation module 540 may be able to access the attestation 501 from the identity hub 411 as shown at 503A so as to present the attestation 501 to the entity 560.

In the embodiment, the attestation presentation module 540 may receive a request 503B from the DID owner 201 to present to the attestation 501 to the entity 560. This may occur at the time the DID owner 201 wants to rent the car or motorized vehicle from the entity 560. Thus, the request 503B may be considered an attempt by the DID owner 201 to present the attestation 501 to the entity 560.

In the embodiment, the attestation presentation module 540 may access the attestation 501 as previously described. However, when attempting to present the attestation 501 to the entity 560, the attestation presentation module 540 may read or otherwise operate on the interrupt metadata 510 that is included in the attestation 501. As previously described, the interrupt metadata 510 may prevent the attestation presentation module 540 from being able to complete the presentation of the attestation 501 to the entity 560 and may require that the entity 550 be contacted for authorization to present the attestation 501. In other words, the interrupt metadata 510 makes it so the DID owner 201 is not able to present the attestation 501 to the entity 560 without first receiving authorization in some form from the entity 550 to present the attestation.

Accordingly, as shown at 504, the attestation presentation module 540 may contact the entity 550 using the contact metadata 511 if included in the interrupt metadata 510. Upon being contacted by the attestation presentation module 540, the entity 550 may determine if it wants to authorize the DID owner 201 to be able to present the attestation 501 to the entity 560 or not. Accordingly, the entity 550 may generate authorization information 520 that indicates if the DID owner 201 is to be able to present the attestation 501. The authorization information 520 may be received by the attestation presentation module 540 and attached to the attestation 501 so as to control whether the DID owner 201 is authorized or not to present the attestation 501 and provided to the DID owner 201 as shown at 505.

The authorization information 520 may take several forms as will now be explained. It will be noted that the authorization information 520 may include one of the discussed forms, all of the discussed forms, a subset of the discussed forms, or even a one or more forms in addition to or alternative to those discussed below as illustrated by the ellipses 529.

In one embodiment, the authorization information 520 may take the form of or include permission information 525. The permission information 525 may specify a given permission for the DID owner 201. For example, the entity 550 may have no problem with the DID owner 201 presenting the attestation 501 to the entity 560 and so the permission information 525 may grant permission. In the embodiment where the entity 550 is the DMV and the entity 560 is the car rental agency, the DMV 550 may provide permission information 525 that allows the DID owner 201 to present the attestation 501 if it has no problem with the DID owner renting from the car rental agency 560.

However, in the case where the entity 550 does not want the DID owner 201 to present the attestation 501 to the entity 560, the permission information 525 may deny permission. In one embodiment, this denial may take the form of the permission information 525 rendering the attestation 501 unusable by the entity 560. In such case, even if the DID owner 201 is somehow able to present the attestation 501 to the entity 560, it would be unusable by the entity 560.

In the embodiment where the entity 550 is the DMV and the entity 560 is the car rental agency, suppose the car rental agency 560 has a reputation for renting cars or other motorized vehicles that have caused a large number of accidents due to poor car maintenance. In such embodiment, the DMV 550 may want to deny authorization to present the attestation 501 so that the DID owner 201 is not able to rent from the car rental agency 560. Accordingly, the DMV 550 may provide permission information 525 that denies permission to present to the car rental agency 560 or that renders the attestation 501 unusable by the car rental agency 560 as previously described.

In another embodiment, the authorization information 520 may take the form of or include call-back metadata 526. In operation, the call-back metadata 526 may direct the entity 560 to contact the entity 550 to determine if the attestation 501 is still valid, which may be useful if a long period of time has passed since the entity 550 issued the attestation 501 to the DID owner 201. In the embodiment where the entity 550 is the DMV and the entity 560 is the car rental agency, the call-back metadata 526 may allow the car rental agency 560 to find out from the DMV 550 if the driver's license of DID owner 201 is still valid. This may increase the confidence of the interaction between the DMV 550 and the car rental agency 560.

In another embodiment, the authorization information 520 may take the form of or include location information 527. In operation, the location information 527 may limit the ability of the DID owner 201 to present the attestation 501 to certain locations that are approved by the entity 550. Thus, the DID owner may only be able to present the attestation 501 to the entity 560 if the entity 560 is located in an approved location. For example, in the embodiment where the entity 550 is the DMV and the entity 560 is the car rental agency, the DMV 550 may wish to limit use of the attestation 501 including the driver's license information to certain countries it has determined are safe. Thus, if the car rental agency 560 is located in an approved country, the location information 527 may allow the DID owner 201 to present the attestation 501 to the car rental agency 560. However, if the car rental agency 560 is not located in an approved country, the location information 527 may not allow the DID owner 201 to present the attestation 501 to the car rental agency 560.

In still another embodiment, the authorization information 520 may take the form of or include an update 528 to the attestation 501. Thus, the update 528 allows the entity 550 to ensure that the attestation 501 is always up to date when the DID owner 201 presents it to the entity 560. For example, in the embodiment where the entity 550 is the DMV and the entity 560 is the car rental agency, the update 528 allows the DMV 550 to ensure that the DID owner 201 always has updated driver's license information when renting from the car rental agency 560.

In some embodiments, prior to providing the authorization information 520, the entity 550 may require that DID owner 201 provide identification information 515 as shown at 506 that verifies that it is actually the DID owner 201 who is attempting to present the attestation 501 to the entity 560. This may help the entity 550 ensure that a third party is not pretending to be the DID owner 201 and trying to use the attestation 501 is an impermissible way. The identification information 515 may simply be the DID 205. Alternatively, identification information 515 may be a pairwise identifier between the DID owner 201 and the entity 550. The identification information 515 may include further identifying information as needed that is agreed upon between the DID owner 201 and the entity 550. Thus, the DID owner 201 may be able to specify with the entity 550 what types of identifying information should be requested by the entity 550 so as to maintain control over his or her identity.

For example, suppose in the embodiment where the entity 550 is the DMV and the entity 560 is the car rental agency that a third party who is not the DID owner 201 attempts to present the attestation 501 that include the driver's license information to rent a car from the car rental agency 560. The third party may have stolen the device of the DID owner 201 and have gotten access to the attestation 501. The car rental agency 560 may not have a way to determine if the party presenting the attestation 501 is actually the DID owner 201. By requiring the identification information 515 to validate or authenticate the DID owner 201, the DMV 550 may be able to prevent the impermissible use of the attestation 501.

In response to receiving the authorization information 520 (in whatever valid form), the DID owner 201 may then be authorized to present the attestation 501 to the entity 560. Accordingly, as shown at 507 the attestation presentation module 540 may present the attestation 501 to the entity 560. The entity 560 may then use the attestation 501 in a desired manner. For example, in the embodiment where the entity 550 is the DMV and the entity 560 is the car rental agency, the car rental agency 560 may use the attestation 501 to determine if the DID owner 201 has a valid driver's license and if it should rent a car or other motorized vehicle to the DID owner 201.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

FIG. 6 illustrates a flow chart of an example method 600 for providing a presentation interrupt for a DID attestation or claim. The method 600 will be described with respect to one or more of FIGS. 1-5 discussed previously.

The method 600 includes an act of accessing a DID attestation issued by a first entity of a decentralized network (act 610). The DID attestation defines information that has been generated by the first entity about a DID owner who is the subject of the DID attestation. The DID attestation includes interrupt metadata that directs that the first entity be contacted prior to the DID owner being able to present the DID attestation to a second entity of the decentralized network.

For example, as previously described the attestation presentation module 540 may access the attestation 501 as shown at 503A. The attestation 501 may be generated by the entity 550 and defines information about the DID owner 201 who is the subject of the attestation 501. The attestation 501 is thus related to the DID 205 of the DID owner 201 and may be considered a DID attestation. The attestation 501 may include the interrupt metadata 510 that directs that the entity 550 be contacted before the DID owner 201 is able to present the attestation 501 to the entity 560.

The method 600 includes, in response to the DID owner attempting to present the DID attestation to the second entity, an act of contacting the first entity as directed by the interrupt metadata (act 620). For example, as previously described the attestation presentation module 540 may, in response to the DID owner 201 attempting to present the attestation 501 to the entity 560 as shown at 503B, contact the entity 550 as shown at 504 as directed by the interrupt metadata 510.

The method 600 includes an act of receiving authorization information from the first entity (act 630). The authorization information indicates if the DID owner is able to present the DID attestation to the second entity. For example, as previously described the attestation presentation module 540 may receive the authorization information 520 as shown at 505. The authorization information 520 may identify if the DID owner 201 is able to present the attestation 501 to the entity 560.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that is implemented in a decentralized network that implements a distributed ledger, the distributed ledger being configured to back one or more decentralized identities (DID) for one or more users of the computing system, the computing system comprising:
   one or more processors; and
   one or more computer-readable media having thereon computer-executable instructions that are structured such that, when executed by the one or more processors, cause the computing system to:
   access a DID attestation issued by a first entity of the decentralized network, the DID attestation defining information that has been generated by the first entity about a DID owner who is the subject of the DID attestation, the DID attestation including interrupt metadata that directs that the first entity be contacted prior to the DID owner being able to present the DID attestation to a second entity of the decentralized network;
   in response to the DID owner attempting to present the DID attestation to the second entity, contact the first entity as directed by the interrupt metadata; and
   receiving authorization information from the first entity, the authorization information indicating if the DID owner is able to present the DID attestation to the second entity.

2. The computing system according to claim 1, wherein the executed computer-executable instructions further cause the computing system to:
   in response to receiving the authorization information from first entity, present the DID attestation to the second entity.

3. The computing system according to claim 1, wherein the authorization information includes an update to the DID attestation.

4. The computing system of claim 1, wherein the authorization information includes call-back metadata that directs the second entity to contact the first entity to determine if the DID-attestation is valid.

5. The computing system according to claim 1, wherein the authorization information includes location information specifying a geographical area where the DID owner is authorized to present the DID attestation to the second entity.

6. The computing system according to claim 1, wherein the interrupt information includes contact metadata that defines how to contact the first entity so as to receive the authorization information.

7. The computing system according to claim 1, wherein the DID owner is not able to present the DID attestation to the second entity without first receiving the authorization information from the first entity.

8. The computing system according to claim 1, wherein the authorization information renders the DID attestation unusable by the second entity when the first entity does not grant permission for the DID owner to present the DID attestation to the second entity.

9. The computing system according to claim 1, wherein the executed computer-executable instructions further cause the computing system to:
   when contacting the first entity, provide identification information to the first entity that verifies that it is the DID owner who is attempting to present the DID attestation to the second entity.

10. In a computing system that is implemented in a decentralized network that implements a distributed ledger, the distributed ledger being configured to back one or more decentralized identities (DID) for one or more users of the computing system, a method for providing a presentation interrupt for a DID attestation or claim, the method comprising:
    an act of accessing a DID attestation issued by a first entity of the decentralized network, the DID attestation defining information that has been generated by the first entity about a DID owner who is the subject of the DID attestation, the DID attestation including interrupt metadata that directs that the first entity be contacted prior to the DID owner being able to present the DID attestation to a second entity of the decentralized network;

in response to the DID owner attempting to present the DID attestation to the second entity, an act of contacting the first entity as directed by the interrupt metadata; and an act of receiving authorization information from the first entity, the authorization information indicating if the DID owner is able to present the DID attestation to the second entity.

11. The method according to claim 10, further comprising:

in response to receiving the authorization information from first entity, an act of presenting the DID attestation to the second entity.

12. The method according to claim 10, wherein the authorization information includes an update to the DID attestation.

13. The method according to claim 10, wherein the authorization information includes call-back metadata that directs the second entity to contact the first entity to determine if the DID-attestation is valid.

14. The method according to claim 10, wherein the authorization information includes information specifying a geographical area where the DID owner is authorized to present the DID attestation to the second entity.

15. The method according to claim 10, wherein the interrupt information includes contact metadata that defines how to contact the first entity so as to receive the authorization information.

16. The method according to claim 10, wherein the DID owner is not able to present the DID attestation to the second entity without first receiving the authorization information from the first entity.

17. The method according to claim 10, wherein the authorization information renders the DID attestation unusable by the second entity when the first entity does not grant permission for the DID owner to present the DID attestation to the second entity.

18. The method according to claim 10, further comprising:

when contacting the first entity, an act of providing identification information to the first entity that verifies that it is the DID owner who is attempting to present the DID attestation to the second entity.

19. A computer program product comprising one or more computer-readable storage media having thereon computer-executable instructions that are structured such that, when executed by one or more processors of a computing system, cause the computing system to perform a method for providing a presentation interrupt for a DID attestation or claim, the method comprising:

an act of accessing a DID attestation issued by a first entity of the decentralized network, the DID attestation defining information that has been generated by the first entity about a DID owner who is the subject of the DID attestation, the DID attestation including interrupt metadata that directs that the first entity be contacted prior to the DID owner being able to present the DID attestation to a second entity of the decentralized network;

in response to the DID owner attempting to present the DID attestation to the second entity, an act of contacting the first entity as directed by the interrupt metadata; and an act of receiving authorization information from the first entity, the authorization information indicating if the DID owner is able to present the DID attestation to the second entity.

20. The computer program product according to claim 19, further comprising:

in response to receiving the authorization information from first entity, an act of presenting the DID attestation to the second entity.

* * * * *

UNITED STATES PATENT AND TRADEMARK OFFICE
CERTIFICATE OF CORRECTION

PATENT NO. : 11,240,244 B2  
APPLICATION NO. : 16/453776  
DATED : February 1, 2022  
INVENTOR(S) : Brandon Murdoch et al.

Page 1 of 1

It is certified that error appears in the above-identified patent and that said Letters Patent is hereby corrected as shown below:

On the Title Page

Item (73), Assignee
Line 1, change "MICROSOFT TECHNOLOGLY LICENSING, LLC" to --MICROSOFT TECHNOLOGY LICENSING, LLC--

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*